(12) United States Patent
Elnajjar et al.

(10) Patent No.: US 10,805,777 B2
(45) Date of Patent: Oct. 13, 2020

(54) SYSTEM AND METHOD TO DISPLAY INFORMATION

(71) Applicant: GM GLOBAL TECHNOLOGY OPERATIONS LLC, Detroit, MI (US)

(72) Inventors: Hassan A. Elnajjar, Dearborn, MI (US); Steve P. Schwinke, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 5 days.

(21) Appl. No.: 16/293,925

(22) Filed: Mar. 6, 2019

(65) Prior Publication Data
US 2020/0288289 A1   Sep. 10, 2020

(51) Int. Cl.
| | |
|---|---|
| G06F 15/16 | (2006.01) |
| H04W 4/44 | (2018.01) |
| G06Q 30/02 | (2012.01) |
| H04N 21/81 | (2011.01) |

(52) U.S. Cl.
CPC .......... *H04W 4/44* (2018.02); *G06Q 30/0252* (2013.01); *G06Q 30/0265* (2013.01); *H04N 21/812* (2013.01)

(58) Field of Classification Search
CPC . H04W 4/44; G06Q 30/0252; G06Q 30/0265; H04N 21/812
USPC ........................................................ 709/217
See application file for complete search history.

(56) References Cited

U.S. PATENT DOCUMENTS

| | | | |
|---|---|---|---|
| 2017/0371608 A1 | 12/2017 | Wasserman | |
| 2018/0232770 A1* | 8/2018 | Miller | ................. G05D 1/0214 |
| 2019/0220898 A1* | 7/2019 | Rhodes | .............. G06Q 30/0266 |
| 2020/0045358 A1* | 2/2020 | Modi | .................. G01C 21/3605 |

* cited by examiner

*Primary Examiner* — Wing F Chan
*Assistant Examiner* — Joseph R Maniwang

(57) ABSTRACT

One general aspect includes a method to display information, the method including: receiving over a V2X channel, via a processor, media content related information from a vehicle; producing, via the processor, an advertisement based on the media content related information; and exhibiting, via the processor, the advertisement on a display positioned at a remote location visible to the vehicle.

19 Claims, 3 Drawing Sheets

SYSTEM AND METHOD TO DISPLAY INFORMATION

INTRODUCTION

Billboards and other advertising related signs are an effective tool to display an advertisement to a wide vehicular audience. Billboards can also be an effective tool to support other forms of advertising and marketing. For example, someone can learn about a product they like by hearing an advertisement on the radio or seeing an advertisement on their television, in a magazine, or on the internet. That person can then be reminded of their desire for the product when they are driving by a billboard advertising the product. However, it can be the case that by the time that the person is exposed to the billboard they have already forgotten they had any interest in purchasing the product. Thus, in these instances, the billboard loses its effectiveness and fails to support the other forms of advertising and marketing. It would therefore be advantageous for the billboard to provide supportive advertising while someone is learning about a product or while that product is still fresh in their minds. This will also ensure the billboard provides maximum effectiveness. As follows, it would be desirable to provide a system and method that would allow a billboard to learn of the media content being played over a vehicle's radio and in turn display related advertising. This will allow the vehicle operator to receive at least two impressions of a product they may be interested in, one from their radio and the other on the billboard. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to display information, the method including: receiving over a V2X channel, via a processor, media content related information from a vehicle; producing, via the processor, an advertisement based on the media content related information; and exhibiting, via the processor, the advertisement on a display positioned at a remote location visible to the vehicle. Other embodiments of this aspect include corresponding computer systems, apparatus, and computer programs recorded on one or more computer storage devices, each configured to perform the actions of the methods.

Implementations may include one or more of the following features. The method further including: receiving over a radio channel, via a telematics unit located in the vehicle, media content; delivering, via the telematics unit, the media content as sound through an audio system; and transmitting over the V2X channel, via the telematics unit, media content related information to the processor while the media content is being delivered as sound. The method where the media content related information is a unique identifier associated with the media content. The method where the media content related information is a sample of the media content. The method where: the media content related information is received over the V2X channel from a plurality of vehicles; and the advertisement produced by the processor is most relevant to the media content related information received from the plurality of vehicles. The method where the step of producing the advertisement based on the media content related information includes the processor implementing one or more artificial intelligence techniques to classify a topic of the media content related information. The method where the display is part of a billboard structure. Implementations of the described techniques may include hardware, a method or process, or computer software on a computer-accessible medium.

One general aspect includes a system to display information, the system including: a display device at a location that can be visible to a vehicle, the display device including: a display; a device memory configured to include one or more executable instructions and a device processor configured to execute the executable instructions, where the executable instructions enable the device processor to carry out the steps of: receiving from the vehicle, over a V2X channel, media content related information; producing an advertisement based on the media content related information; and exhibiting the advertisement on the display. Other embodiments of this aspect include corresponding computer systems, apparatus, and computer programs recorded on one or more computer storage devices, each configured to perform the actions of the methods.

Implementations may include one or more of the following features. The system further including: a telematics unit installed in the vehicle, the telematics unit including: a telematics memory configured to include one or more executable instructions and a telematics processor configured to execute the executable instructions, where the executable instructions enable the telematics processor to carry out the steps of: receiving, over a radio channel, media content; delivering the media content as sound through an audio system; and transmitting, over the V2X channel, media content related information to the telematics processor while the media content is being delivered as sound. The system where the media content related information is a unique identifier associated with the media content. The system where the media content related information is a sample of the media content. The system where: the media content related information is received over the V2X channel from a plurality of vehicles; and the advertisement produced by the device processor is most relevant to the media content related information received from the plurality of vehicles. The system where the step of producing the advertisement based on the media content related information includes the device processor implementing one or more artificial intelligence techniques to classify a topic of the media content related information. The system where the display is part of a billboard structure. Implementations of the described techniques may include hardware, a method or process, or computer software on a computer-accessible medium.

One general aspect includes a system to display information, the system including: a telematics unit installed in a vehicle, the telematics unit including: a telematics memory configured to include one or more executable instructions and a telematics processor configured to execute the executable instructions, where the executable instructions enable the telematics processor to carry out the steps of: receiving, over a radio channel, media content; delivering the media content as sound through an audio system; and transmitting, over a V2X channel, a unique identifier associated with the media content to a billboard system while the media content is being delivered as sound; and the billboard system being at a location that can be visible to the vehicle, the billboard system including: a display; a billboard memory configured to include one or more executable instructions and a billboard processor configured to execute the executable instructions, where the executable instructions enable the billboard processor to carry out the steps of: receiving from the vehicle, over the V2X channel, the unique identifier; producing an advertisement based on the unique identifier; and exhibiting the advertisement on the display. Other embodiments of this aspect include corresponding computer systems, apparatus, and computer programs recorded on one or more computer storage devices, each configured to perform the actions of the methods.

Implementations may include one or more of the following features. The system further including: where the executable instructions enable the billboard processor to carry out an additional step of: receiving from the vehicle, over the V2X channel, a plurality of additional unique identifiers; and where the step of producing the advertisement based on the unique identifier is redefined as producing the advertisement based on the unique identifier as well as the plurality of additional unique identifiers. The system where the step of producing the advertisement based on the unique identifier as well as the plurality of additional unique identifiers includes implementing a voting technique such that the advertisement will be relevant to a highest number of unique identifiers identified by the voting technique. The system where, when the voting technique cannot identify the highest number of unique identifiers, the billboard processor will choose one unique identifier amongst the unique identifier and the plurality of additional unique identifiers such that the advertisement will be relevant to the chosen unique identifier. The system where: the executable instructions enable the telematics processor to carry out the additional steps of: receiving, over the V2X channel, a plurality of additional unique identifiers from a plurality of vehicles; producing a most relevant unique identifier based on the unique identifier and the plurality of additional unique identifiers; where the step of transmitting, over the V2X channel, the unique identifier associated with the media content to the billboard system is redefined as telematics processor only transmitting the most relevant unique identifier to the billboard system; and where the executable instructions enable the billboard processor to carry out the additional steps of: receiving, over the V2X channel, the most relevant unique identifier; and producing the advertisement based on the most relevant unique identifier. Implementations of the described techniques may include hardware, a method or process, or computer software on a computer-accessible medium.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
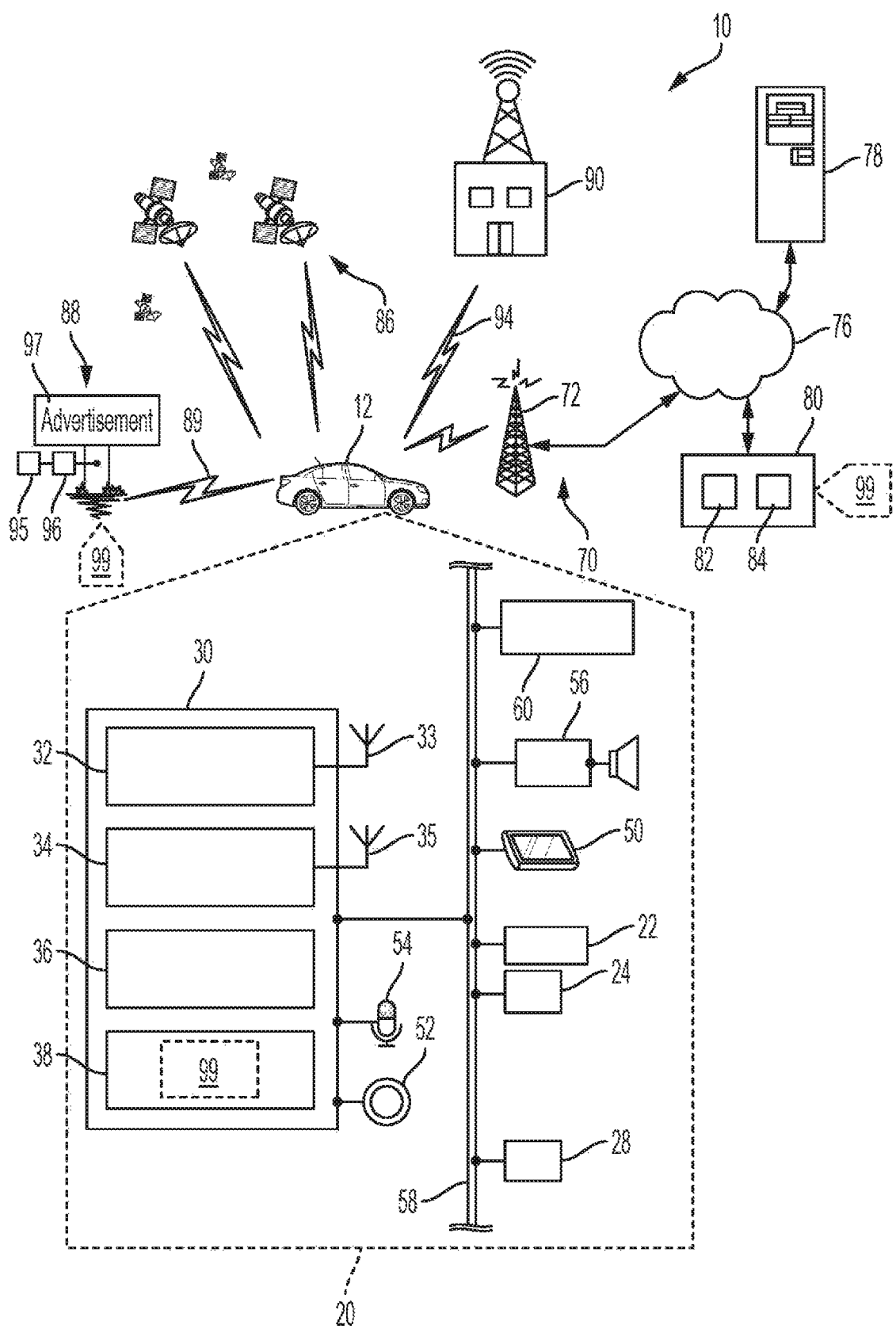
FIG. 1 is a block diagram depicting an exemplary embodiment of system capable of utilizing the system and method disclosed herein.

With reference to FIG. 1, there is shown an operating environment that comprises a communications system 10 and that can be used to implement the method disclosed herein. Communications system 10 generally includes a vehicle 12 that includes vehicle electronics 20, one or more wireless carrier systems 70, a land communications network 76, a computer or server 78, a vehicle backend services facility 80, and a constellation of global navigation satellite system (GNSS) satellites 86. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the vehicle electronics 20 are shown generally, in FIG. 1 and includes a global navigation satellite system (GNSS) receiver 22, a body control module or unit (BCM) 24, and other vehicle system modules (VSMs) 28, a telematics unit 30, vehicle-user interfaces 50-56, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from computer 78 or remote facility 80 via land network 76 and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites 86. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 86. And, in another example, GNSS receiver 22 can be a BDS receiver that receives a plurality of GNSS (or BDS) signals from a constellation of GNSS (or BDS) satellites 86. The GNSS received can determine a current vehicle location based on reception of a plurality of GNSS signals from the constellation of GNSS satellites 86. The vehicle location information can then be communicated to the telematics unit 30, or other VSMs, such as the onboard computer 60. In one embodiment (as shown in FIG. 1), the wireless communications module and/or a telematics unit 30 can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with telematics unit 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM to direct one or more vehicle functions or operations including, for example, controlling central locking, power windows 11, power sun/moon roof, the vehicle's head lamps 98, the horn system 99, air conditioning operations, power mirrors, controlling the vehicle primary mover (e.g., engine, primary propulsion system), and/or controlling various other vehicle modules. In one embodiment, the BCM 24 can be used (at least in part) to detect a vehicle event, such as a power on state or a power off state or when the vehicle's air conditioning operations are turned ON or OFF (i.e., cooled air is being blown or is stopped being blown from the vents of the vehicle's Heating Ventilation and Air Conditioning (HVAC) system), based on one or more onboard vehicle sensor readings, as discussed more below.

Telematics unit 30 is capable of communicating data via SRWC through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at remote facility 80. This enables the vehicle to communicate data or information with remote systems, such as remote facility 80.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out Vehicle-to-everything (V2X) communications such as, for example, vehicle-to-vehicle (V2V) communications, or vehicle-to-infrastructure (V2I) communications with infrastructure systems or devices, such as the remote facility 80. And, in other embodiments, other protocols can be used for V2X communications (e.g., C-V2X for cellular communications using 3GPP or 5G wireless protocols).

The SRWC circuitry 32 enables the telematics unit 30 to transmit and receive SRWC signals, such as BLE signals. The SRWC circuit can allow the telematics unit 30 to connect to another SRWC device. Additionally, in some embodiments, the telematics unit 30 contains a cellular chipset 34 thereby allowing the device to communicate via one or more cellular protocols, such as those used by cellular carrier system 70, through antenna 35. In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at remote facility 80 or computers 78) via packet-switched data communication. This packet switched data communication may be carried out through use of a non-vehicle wireless access point or cellular system that is connected to a land network via a router or modem. When used for packet-switched data communication such as TCP/IP, the telematics unit 30 can be configured with a static Internet Protocol (IP) address or can be set up to automatically receive an assigned IP address from another device on the network such as a router or from a network address server.

Packet-switched data communications may also be carried out via use of a cellular network that may be accessible by the telematics unit 30. Telematics unit 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the telematics communications device 30 to provide other data, response, and/or control input. Audio system 56 provides audio output to a vehicle occupant and can be a dedicated, stand-alone system or part of the primary vehicle audio system. As such, audio system 56 receives analog information, rendering and delivering it as sound, via the entertainment bus. According to one embodiment, audio system 56 is operatively coupled to both vehicle bus 58 and an entertainment bus (not shown) and can provide amplitude modulated (AM) radio, frequency modulated (FM) radio, Real-time Streaming Protocol (RTSP) radio (IP streaming audio—such as, for example, Pandora Radio, Netflix, Spotify, Amazon Music, etc.), satellite radio, CD, DVD, and other multimedia functionality. Audio component 64 may contain a speaker system, or may utilize a speaker via arbitration on communications bus 58. This functionality can be provided in conjunction with or independent of an infotainment module.

Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. Various other vehicle-user interfaces can also be utilized, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components that may be needed to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown) can be used for one or more purposes, such as for providing backend vehicle services to a plurality of vehicles (such as vehicle 12) and/or for providing other vehicle-related services. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving data communicated from the vehicle, as well as setting up and/or configuring subscriber preferences or controlling vehicle functions; or a vehicle telemetry data server that receives and stores data from a plurality of vehicles.

Vehicle backend services facility 80 is a remote facility, meaning that it is located at a physical location that is located remotely from the vehicle 12. The vehicle backend services facility 80 (or "remote facility 80" for short) may be designed to provide the vehicle electronics 20 with a number of different system back-end functions through use of one or more electronic servers 82 or live advisors. The vehicle backend services facility 80 includes vehicle backend services servers 82 and databases 84, which may be stored on a plurality of memory devices. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases 84 at the remote facility 80 can store various information and can include a vehicle operation database that stores information regarding the operation of various vehicles (e.g., vehicle telemetry or sensor data).

One or more databases 84 at the remote facility 80 can also store information in the form of executable instructions such as, but not limited to, one or more application program interface (API) suites. The API suites may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

One API suite can provide advertisement information that is capable of being exhibited on an electronic display (Ad module 99). This Ad module 99 is particularly configured to receive one or more unique identifiers associated with an advertising version of the media content being played at the audio system 56 (or within a couple of seconds after it has been played). Ad module 99 can then produce advertisement information associated with the unique identifier (e.g., by retrieving one or more advertisements stored in a memory).

Alternatively, which may be when non-advertising media content (e.g., music, talk radio, sporting events, etc.) is being played at the audio system, Ad module 99 can implement one or more known artificial intelligence (AI) techniques to produce relevant advertisement information matching this kind of media content. For example, Ad module 99 can analyze a sample of the media content at the time it is being played at the audio system 56 (e.g., producing an audio fingerprint derived from a spectrogram time-frequency graph) and use at least one decision tree to classify an advertisement topic relevant to that media content sample. Ad module 99 could then produce advertisement information associated with the advertisement topic (e.g., by retrieving one or more advertisements stored in a memory). To illustrate, Ad module 99 could use this AI technique to, produce a Christmas advertisement while Christmas songs are being played in the vehicle cabin, produce an ad for a financial advisor firm while business news is being played in the vehicle, produce an ad for a music concert while the musical artist headlining the concert is being played in the vehicle, produce an ad for a competing software application/media streaming service while a competing software application is being used in the vehicle or competing streaming service is being used in the vehicle, produce an ad for a software application that is currently installed in the vehicle (for example, when Ad module 99 retrieves a list of software downloaded to memory 38), or the like.

Display device 88 can be an enhanced billboard or sign that includes a device processor 95, device memory 96, device display 97, and V2X enhanced transceiver. Display device is also capable of conducting cellular network communications over wireless carrier system 70 (via a cellular chipset). Each of the electronic components of the display device 88 are similar in structure and function to those analogous components discussed above with regard to the vehicle electronics 20 and/or remote facility 80. Furthermore, when in a wireless range, display device 88 can receive information from vehicle 12 via a V2X communications channel 89 (e.g., 802.11p (DSRC), 3GPP (C-V2X), etc.). This transmission may occur after telematics unit 30 acts as a beacon to transmit information out at set time intervals for receipt by a wide audience that includes any V2X enhanced devices (e.g., display device 88) within range of the V2X communications channel 89. This transmission may also occur after the display device 88, acting as the beacon, pings the telematics unit 30 and telematics unit 30 responds by transmitting information to display device 88 over the V2X communications channel 89. Moreover, ad server 82 may be installed onto various kinds of infrastructure such as, for example, a billboard frame system, the sides of buildings (e.g., restaurants, apartment buildings, storefronts, etc.), cell towers, and traffic lights. Skilled artists will see that wireless transactions between vehicle 12 and V2X enhanced infrastructure are well known in the art. It should also be understood that Ad module 99 can be uploaded to the memory of display device 88.

Device processor 95 can be any type of device capable of processing electronic instructions including microprocessors, microcontrollers, host processors, controllers, vehicle communication processors, and application specific integrated circuits (ASICs). Device processor 95 executes various types of digitally-stored instructions, such as software or firmware programs stored in device memory 96 (e.g., Ad module 99). For instance, in one embodiment, the device processor 95 can execute programs or process data to carry out at least a part of the method discussed herein. Device memory 96 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. Device display 97 is an output device that is configured to exhibit information in pictorial form. Display device 97 can include a thin film transistor liquid crystal display (TFT-LCD) with LED backlighting having replaced cold-cathode fluorescent lamp (CCFL) backlighting (i.e., an LED display).

Radio station 90 is a commercial entity that broadcasts media content (e.g., songs, advertisements, sporting events, etc.) via radio waves intended to reach a wide audience (i.e., a radio channel). Station 90 can be linked to others similar entities via radio networks to broadcast a common radio format (e.g., broadcast syndication, simulcast, or the like). Radio station 90 can also broadcast advertisements as well as the unique identifier for each advertisement (i.e., the ad ID).

METHOD

The method or parts thereof can be implemented in a computer program product (e.g., processor 36) embodied in a computer readable medium and including instructions usable by one or more processors of one or more computers of one or more systems to cause the system(s) to implement one or more of the method steps. The computer program product may include one or more software programs comprised of program instructions in source code, object code, executable code, or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 2:
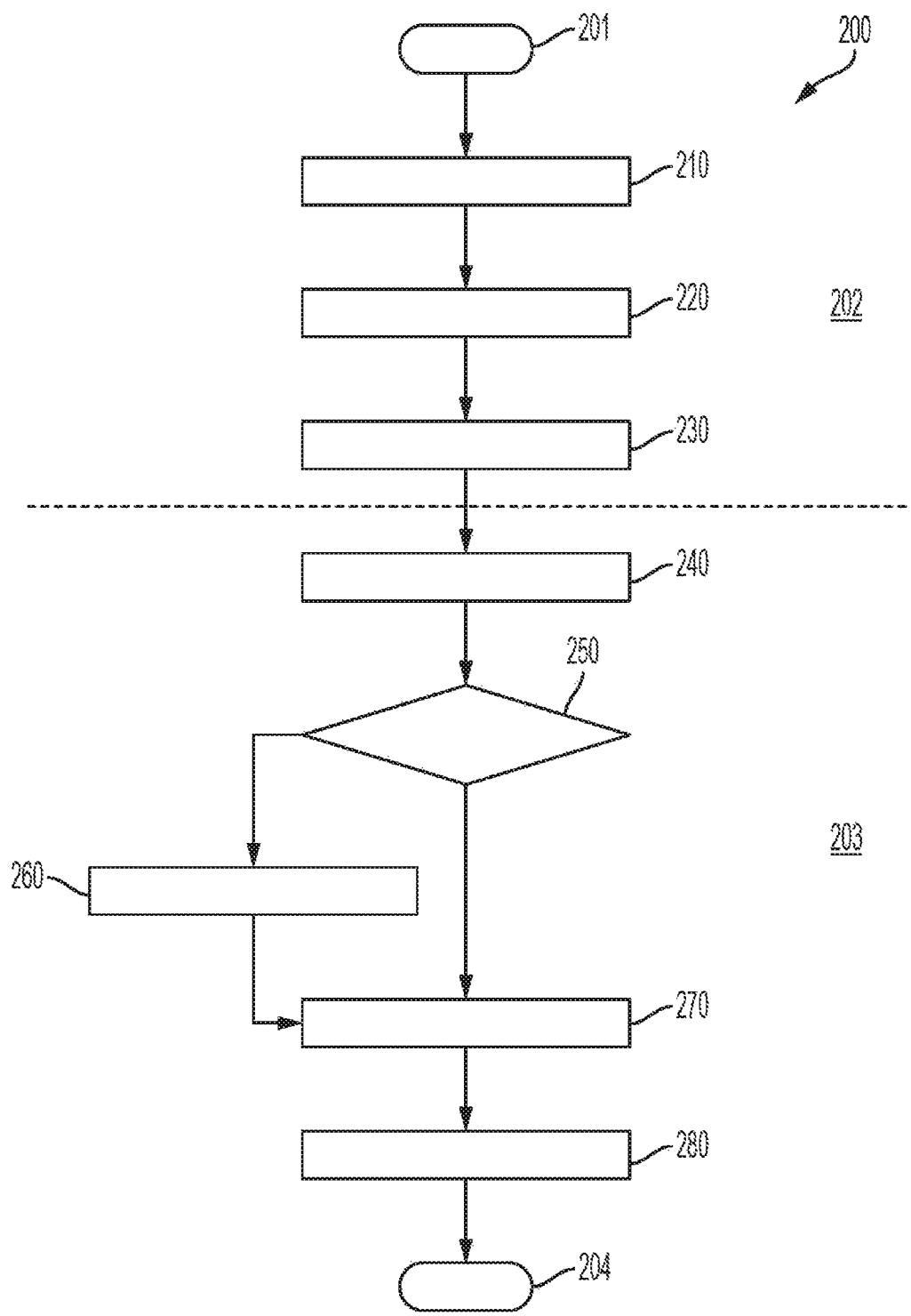
FIG. 2 is a flowchart of an exemplary process to receive and deliver media content.

Turning now to FIG. 2, there is shown an embodiment of a method 200 to display information on a V2X enhanced billboard that can be seen by one or more vehicles (e.g., while traveling along a road segment). One or more aspects of the information displaying method 200 may be completed through display device 88 (i.e., the enhanced billboard) which may include one or more executable instructions incorporated into device memory 96 and carried out by display device processor 95. One or more other aspects of the information displaying method 200 may be completed through telematics unit 30 which may include one or more executable instructions incorporated into memory device 38 and carried out by electronic processing device 36. One or more ancillary aspects of method 200 may also be completed by radio station 90, audio system 56, remote facility 80, and/or Ad module 99. Skilled artisans will moreover see that telematics unit 30, radio station 90, and display device 88 are remotely located from each other.

Method 200 is supported by telematics unit 30 being configured to communicate with display device 88 over a V2X wireless communication protocol 89. This configuration may be made by a vehicle manufacturer at or around the time of the telematics unit's assembly or after-market (e.g., via vehicle download using the afore-described communication system 10 or at a time of vehicle service, just to name a couple of examples). Method 200 is supported by telematics unit 30 being able to receive information over a radio channel 94 (e.g., AM, FM, RTSP, satellite radio, etc.) as well as telematics unit 30 being able to deliver media content as sound through audio system 56 and video through display 50. These configurations may also be made by a vehicle manufacturer at or around the time of the vehicle's assembly or after-market. Method 200 is further supported by preconfiguring display device 88 to receive information and retrieved stored information from Ad module 99 (e.g., uploaded to the display memory 96, databases 84, or the memory of computer 78). Skilled artists will see that media content is information directed towards an end-user or audience such as, for example, audio books, advertisements, music (e.g., songs), telecasted political events (e.g., speeches, protests, rallies), talk radio, telecasted sporting events, and podcasts.

Method 200 begins at 201 in which one or more vehicles 12 are traveling along a road segment 92 and the telematics unit 30 is activated to play media content being broadcast from radio station 90 (such a configuration may have been established via one or more user inputs provided to the infotainment module). In step 210, telematics unit 30 receives media content being broadcasted from radio station 90 over a radio channel 94 (e.g., AM, FM, RTSP, satellite radio, etc.). Moreover, in this step, telematics unit 30 causes this media content to be delivered as sound through audio system 56, and may additionally cause the media content to be delivered on display 50. In essence, in step 210, a vehicle occupant is using the radio transceiver functionality of the telematics unit 30 to listen to a selected radio station 90 over their vehicle's stereo system in a traditional manner (for example—they are listening to music). Moreover, in step 210, when transmitting over an RTSP, the vehicle occupant could be streaming video data that is delivered to display 50 and listening to the delivered video over their vehicle's stereo system in a traditional manner (for example—they are watching a movie on their infotainment system).

In optional step 220, at some point while receiving media content over the radio channel 94, an advertisement is broadcasted and received by telematics unit 30. This advertisement may be broadcasted during one of the commercial time slots designated by radio station 90. Moreover, upon receipt of the advertisement, telematics unit 30 will also receive a unique identifier that is associated with the advertising media content. Telematics unit 30 may then temporarily store the unique identifier in memory 38 just before or while the advertisement is being played by audio system 56.

In step 230, vehicle 12 will come into proximity of display device 88 (e.g., within ten miles) and a V2X protocol based communication channel 89 is established between these two V2X enhanced devices. Moreover, telematics unit 30 will transmit media content related information to the display device 88 over the V2X communications channel 89. As such, while an advertisement is being played over audio system 56 (or within a second before it is played), telematics unit 30 could send over the advertisement's unique identifier to display device 88. However, when no advertisement is currently being played or there isn't a unique identifier being stored in memory 38, telematics unit could also transmit a sample of the media content as it is being delivered as sound (e.g., a sound recorded excerpt of the media content) to display device 88. It should also be understood that the unique identifier and media content sample could be sent at the same time. Skilled artists will see that the V2X communications channel 89 can be established after the display device 88 or vehicle 12 initiates a discovery mode based on broadcast data. As follows, the V2X channel is created after telematics unit 30 automatically broadcasts information out over V2X communications channel 89. Alternatively, this channel 89 can be established after the display device 88 pings the telematics unit 30 to respond by transmitting media content related information to display device 88 via the V2X communications channel 89. Steps 210-230 can be understood as the aspects of method 200 that primarily occur at telematics unit 30 (i.e., the telematics unit aspects 202).

Figure 3:
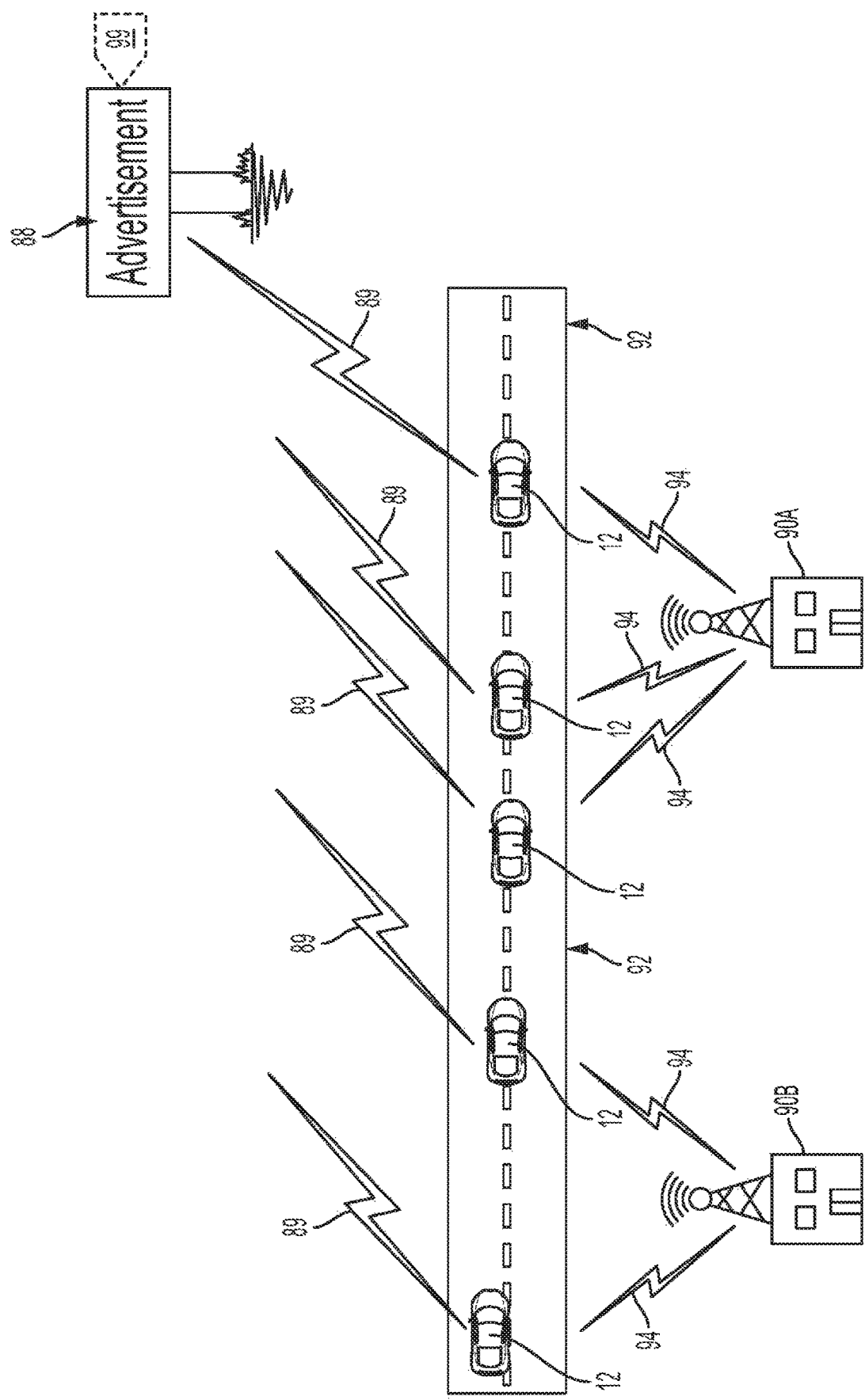
FIG. 3. depicts an exemplary aspect of the process of FIG. 2 in accordance with one or more exemplary embodiments.

In step 240, the media content related information (e.g., the unique identifier and/or media content sample) is delivered to display device 88 over the V2X communications channel 89. As shown in FIG. 3, display device 88 is generally embodied as a V2X enhanced billboard that may be at a location that can be visible to one or more vehicles 12 (e.g., residing next to a road segment 93). Moreover, in these embodiments, the display portion of this billboard structure is large enough and raised high enough for occupants in passing vehicles 12 to see as and understand information being exhibited on the display screen.

In step 250, the processor of display device 88 will determine if it has received additional media content related information from numerous other vehicles 12'. As such, when the display processor 95 determines it has only received media content related information (e.g., a unique identifier and/or media content sample) from one vehicle 12, method 200 will move to step 270. Otherwise, since display processor 95 has determined it has received media content related information from multiple vehicles 12 (e.g., additional unique identifiers and/or additional media content samples), method will move to step 260.

In step 260, in one or more embodiments, device processor 95 will govern which kind of advertisement to exhibit on the device display 97. For example, processor 95 will implement a voting technique to produce an advertisement relevant to a majority of the vehicles 12 in proximity to display device 88 (e.g., within ten miles of the display device). To illustrate, as can also be understood with reference to FIG. 3, when three vehicles 12 transmit a unique identifier (vote) they've received from radio station 90A and two vehicles 12 transmit a unique identifier (vote) they've received from radio station 90B, the device processor 95 will select the unique identifier associated with the media content transmitted by radio station 90A (i.e., the majority outcome of this voting technique—in other words, the highest number of unique identifiers (votes) that are identified by the voting technique). Alternatively, when three vehicles 12 transmit a sample of the media content they are receiving from radio station 90A and two vehicles 12 transmit a sample of the media content they are receiving from radio station 90B, the device processor will select the media content sample transmitted by radio station 90A (i.e., since that radio station was identified with the highest number of unique identifiers). However, when the voting technique does not produce a highest number of unique identifiers (e.g., media content related information has been received from two cars listening to radio station 90A and two cars listening to radio station 90B—making neither unique identifier to be the highest number), device processor may choose the type of media content related information from one of the vehicles 12 and use this chosen information to generate the advertisement. For example, device processor 95 may choose to play an advertisement related to the media content being broadcast by radio station 90A because that advertisement was the first to be received by the device processor (i.e., a First-In-First-Out, FIFO, based system). It should be understood the device processor 95 can use other methodologies to choose the type of media content related information (e.g., random choosing, Last-In-First-Out or LIFO, etc.). In certain embodiments, device processor 95 can additionally take into account the travel direction and distance of each vehicle 12 in relation to the display device 88 and use these factors to weigh the unique identifiers (votes) received for each vehicle. For example, a vehicle 12 traveling away from the display device 88 could have a vote that is a fraction of the worth of a vote from a vehicle 12 traveling toward the display device 88. In another example, a vote from a vehicle 12 that is 9/10 of a mile from display device 88 would be worth less than the vote of a vehicle that is 1/10 of a mile from the display device 88, or vice versa.

Edge computing techniques could also be used to govern which kind of advertisement to exhibit on the device display 97, in one or more alternative embodiments. As such, the decision of which kind of advertisement to exhibit is made at one of the vehicles 12 (i.e., the computations and analytics of Ad module 99 are localized at the vehicle). In this instance, after display device 88 has received media content related information from numerous other vehicles 12, the device processor 95 will compile the information and transmit this compiled information back over the V2X channel 89 to one of the vehicles 12. This can save on the processing power needing to be used by the device processor 95 to carry out the processes to exhibit information on the device display 97. Moreover, the processor 36 of the chosen vehicle's telematics unit 30 will implement a voting technique to produce an outcome that is relevant to the media related content transmitted by a majority of the vehicles 12. Similar to the voting technique discussed above, when three vehicles 12 have transmitted a unique identifier they've received from radio station 90A and two vehicles 12 have transmitted a unique identifier they've received from radio station 90B, processor 36 will select the unique identifier that is associated with the media content transmitted by radio station 90A. Alternatively, when three vehicles 12 have transmitted a sample of the media content they are receiving from radio station 90A and two vehicles 12 have transmitted a sample of the media content they are receiving from radio station 90B, the processor 36 will select the media content sample transmitted by radio station 90A. Processor 36 may also randomly choose the type of media content related information from one of the vehicles 12 when the voting technique does not produce a majority outcome.

It should be understood that edge computing can also be used to filter the media content related information prior to this information being transmitted to display device 88. For example, each of the vehicles 12 in proximity of display device 88 (e.g., within ten miles of the device) can communicate with each other over the V2X communications channel 89. Moreover, the vehicles 12 can pool their media related content together at one of the vehicles 12 in this group (a chosen vehicle). The telematics unit 30 of this chosen vehicle 12 can then implement the voting technique to determine which unique identifier and/or media content sample corresponds to the majority of vehicles 12. When the voting technique does not produce a majority outcome, the telematics unit 30 can randomly choose one of the unique identifiers and/or media content samples within the pool of media content related information as the information being most relevant. Once a unique identifier and/or media content sample considered most relevant to the vehicles has been determined (i.e., the unique identifier and/or media content sample corresponding to the majority of the vehicles in the group), the chosen vehicle 12 (or some other vehicle in the group) will transmit that most relevant unique identifier and/or media content sample to the display device 88 via the V2X channel 89. It should also be understood that, since all decision making takes place prior to any information being transmitted to the device display 97, this edge computing process can occur during step 230 of method 200.

In step 260, device processor will produce an advertisement based on the media content related information. In one or more embodiments, when the media content related information is a unique identifier for an advertisement being played in vehicle 12, this entails the device processor providing Ad module 99 with the unique identifier. Ad module 99 will then retrieve an advertisement associated with the unique identifier from an advertisement library within the databases 84. After the advertisement has been properly retrieved, Ad module 99 will hand it off to the device processor 95. It should be understood that the advertisement library can be frequently updated with new advertising information from remote locations over land communications network 76 (e.g., computer 78).

In one or more alternative embodiments, when the media content related information is a sample of the media content being played in the vehicle 12, the device processor 95 will provide the Ad module 99 with the media content sample and Ad module 99 will implement an AI technique to retrieve the proper advertisement. In this instance, Ad module 99 can produce an audio fingerprint (an acoustic fingerprint), which is a condensed digital summary deterministically generated from an audio signal. Ad module 99 will also put this audio fingerprint into a classification decision tree (as a predictive model) to classify the particular topic of the media content sample. This classification decision tree and may follow a well-known order in which the leaves represent topic classifications and branches represent conjunctions of features that lead to those classifications. However, Ad module 99 could also use a known neural network, k-nearest neighbor technique, kernel method (e.g., a support vector machine (SVM)), Gaussian mixture model, or naive Bayes classifier technique (otherwise known as a simple Bayes or independence Bayes algorithm) to classify the topic of the media content sample. Moreover, Ad module 99 will then retrieve an advertisement that is associated with the media content sample from an advertisement library within the databases 84. After the advertisement has been properly retrieved, Ad module 99 will hand it off to the device processor 95.

In step 270, after the device processor 95 receives the advertisement produced by Ad module 99, the processor 95 will cause the advertisement to be exhibited on the device display 97. The device processor 95 can also cause the advertisement to be displayed for a certain period of time so as to ensure the advertisement has adequate time to be viewed by an occupant in vehicle 12 (e.g., two minutes). Alternatively, after a certain period of time (e.g., 30 seconds) display device 88 could ping vehicle 12 to provide its vehicle location (e.g., produced via GNSS receiver 22) over the V2X channel 89. If the device processor determines the vehicle has already passed by the display device 88 (i.e., a vehicle occupant can no longer view information exhibited on the display of display device 88), then the processor can remove the advertisement from being exhibited on the display (e.g., to cause a subsequent advertisement to be exhibited). Alternatively, when display device 88 recognizes that the V2X communications with vehicle 12 are lost/severed (e.g., vehicle 12 has traveled beyond the range of the V2X signal), the processor can remove the advertisement from being exhibited on the display (e.g., to cause a subsequent advertisement to be exhibited). When multiple vehicles 12 (see FIG. 3) have provided media content related information to the display device 88, after a certain period of time, display device 88 could ping each of the vehicles 12 to provide their vehicle location over the V2X channel 89. If the device processor determines all of the vehicles 12 have passed the display device 88 by, the processor will then remove the advertisement from being exhibited on the display. Alternatively, when the device processor determines the V2X connection with all of the passing vehicle 12 has been lost/severed, the processor will remove the advertisement from being exhibited on the display. After step 270, method 200 moves to completion 204.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to display information, the method comprising:
   receiving over a radio channel, via a telematics unit located in a vehicle, media content related information having a unique identifier
   receiving over a V2X channel, at the telematics unit, a plurality of additional unique identifiers;
   producing, via the telematics unit, a most relevant unique identifier based on the unique identifier and the plurality of additional unique identifiers;
   receiving over the V2X channel, via a processor, the most relevant unique identifier from the vehicle;
   producing, via the processor, an advertisement based on the most relevant unique identifier; and
   exhibiting, via the processor, the advertisement on a display positioned at a remote location visible to the vehicle.

2. The method of claim 1, further comprising:
   delivering, via the telematics unit, the media content related information as sound through an audio system; and
   transmitting over the V2X channel, via the telematics unit, media content related information to the processor while the media content is being delivered as sound.

3. The method of claim 1, wherein the media content related information is associated with the advertisement.

4. The method of claim 1, wherein the display is part of a billboard structure.

5. The method of claim 1, wherein the step of producing the most relevant unique identifier based on the unique identifier and the plurality of additional unique identifiers includes implementing a voting technique such that the most relevant unique identifier will be relevant to a highest number of unique identifiers identified by the voting technique.

6. The method of claim 5, wherein, when the voting technique cannot identify the highest number of unique identifiers, one unique identifier amongst the unique identifier and the plurality of additional unique identifiers will be chosen such that the advertisement will be relevant to the chosen unique identifier.

7. A system to display information, the system comprising:
   a display device at a location that can be visible to a vehicle, the display device comprising:
   a display;
   a device memory configured to comprise one or more executable instructions and a device processor configured to execute the executable instructions, wherein the executable instructions enable the device processor to:
   receive from the vehicle, over a V2X channel, a most relevant unique identifier, wherein the most relevant unique identifier is produced by the vehicle, wherein the most relevant unique identifier is based on a plurality of unique identifiers received at a telematics unit installed in the vehicle;
produce an advertisement based on the most relevant unique identifier; and
exhibit the advertisement on the display.

8. The system of claim 7, further comprising:
the telematics unit comprising:
a telematics memory configured to comprise one or more executable instructions and a telematics processor configured to execute the executable instructions, wherein the executable instructions enable the telematics processor to:
receive, over a radio channel, media content associated with one unique identifier of the plurality of unique identifiers; and
deliver the media content as sound through an audio system.

9. The system of claim 7, wherein the most relevant unique identifier is based on media content related information.

10. The system of claim 7, wherein:
a portion of the plurality of unique identifiers is received at the telematics unit over the V2X channel from a plurality of vehicles.

11. The system of claim 7, wherein the display is part of a billboard structure.

12. The system of claim 7, wherein the plurality of unique identifiers is associated with a plurality of advertisements.

13. The system of claim 7, wherein the most relevant unique identifier is based on a voting technique such that the most relevant unique identifier will be relevant to a highest number of unique identifiers of the plurality of unique identifiers identified by the voting technique.

14. The system of claim 13, wherein, when the voting technique cannot identify the highest number of unique identifiers, one unique identifier amongst the plurality of unique identifiers will be chosen such that the advertisement will be relevant to the chosen unique identifier.

15. The system of claim 7, wherein the executable instructions enable the device processor to:
determine when the vehicle has passed by the display; and
remove the advertisement from the display based on the determination of when the vehicle has passed by the display.

16. The system of claim 7, wherein the executable instructions enable the device processor to:
recognize that one or more V2X communications with the vehicle have been lost; and
remove the advertisement from the display when it is recognized that the one or more V2X communications with the vehicle have been lost.

17. A system to display information, the system comprising:
a telematics unit installed in a vehicle, the telematics unit comprising:
a telematics memory configured to comprise one or more executable instructions and a telematics processor configured to execute the executable instructions, wherein the executable instructions enable the telematics processor to:
receive, over a radio channel, media content;
receive, over a V2X channel, a plurality of additional unique identifiers from a plurality of vehicles;
deliver the media content as sound through an audio system; and
transmit, over the V2X channel, a unique identifier associated with the media content as well as the plurality of additional unique identifiers to a billboard system while the media content is being delivered as sound; and
the billboard system being at a location that can be visible to the vehicle, the billboard system comprising:
a display;
a billboard memory configured to comprise one or more executable instructions and a billboard processor configured to execute the executable instructions, wherein the executable instructions enable the billboard processor to:
receive from the vehicle, over the V2X channel, the unique identifier and the plurality of additional unique identifiers;
produce an advertisement based on the unique identifier as well as the plurality of additional unique identifiers; and
exhibit the advertisement on the display.

18. The system of claim 17, wherein production of the advertisement based on the unique identifier as well as the plurality of additional unique identifiers includes an implementation of a voting technique such that the advertisement will be relevant to a highest number of unique identifiers identified by the voting technique.

19. The system of claim 18, wherein, when the voting technique cannot identify the highest number of unique identifiers, one unique identifier amongst the unique identifier and the plurality of additional unique identifiers will be chosen such that the advertisement will be relevant to the chosen unique identifier.

* * * * *